United States Patent Office 2,879,168
Patented Mar. 24, 1959

2,879,168

CHEMICAL INK

Clarence S. Hunter, Rochester, N.Y., assignor to Eastman Kodak Company, Rochester, N.Y., a corporation of New Jersey No Drawing. Application January 24, 1957
Serial No. 635,980

5 Claims. (Cl. 106—22)

This invention relates to a chemical liquid for use in marking on plastic materials. More particularly, this invention concerns a chemical ink particularly adapted for marking on photographic film.

There are numerous marking liquids described in the prior art, most of which are referred to as inks. Such inks, while useful for imparting inscriptions on sheet materials of a fibrous nature, as illustrated by paper, have little or limited value when adopted for marking on non-fibrous materials. That is, at the present time there is frequently encountered in commercial operations, the need to mark on plastic materials.

One particular type of commercial material upon which there is usually marked names, numbers or the like, is photographic film. There are problems in marking such film products not only because the base material is plastic composition, but such film products may carry various layers thereon. Consequently, as apparent from the prior art as exemplified by patents such as 1,704,124, 1,806,965, 1,828,974, 1,983,910 and 2,173,505, considerable work has already been carried out in formulating liquids which are suitable for marking on photographic film. While many of the prior art liquids thus developed for marking on photographic films have been quite satisfactory and useful on films heretofore in use, they are not entirely suitable for use on some of the present day materials.

That is, prior film frequently exhibited a surface having hydrophobic characteristics. However, there presently is on the market film and sheeting, the surface of which exhibits hydrophilic characteristics. This change in surface characteristics presumably may be due to some extent to the various antistatic and the like layers which have been applied to the plastic film base. However, the composition of the film base has also in some instances been changed in that there presently is used polyester plastics and high acetyl cellulose ester compositions for the film base. On the other hand, the older products were made from a lower acetyl chemical composition.

It is apparent therefore that the development of a new chemical ink which will mark or print on present day film products, even photographic film products having surface coatings over a plastic base, represents a highly desirable result.

This invention has for one object to provide a new chemical ink of a novel composition. Still another object is to provide a chemical ink which is capable of marking not only on the surfaces of newer type plastic films, but at the same time will suitably mark on the older type films. A particular object is to provide a new chemical ink which will mark on photographic film. Still another object is to provide an ink of the class described which is quickly absorbed thereby lending itself to use in continuously operated processes. Another object is to provide an ink which is relatively economical and simple to manufacture. Other objects will appear hereinafter.

After considerable investigation I have found a new chemical ink of relatively simple composition but which is unique in that it has the characteristic of printing on both hydrophobic and hydrophilic surfaces. In the broader aspects of my invention, my chemical ink may be regarded as containing three components. The principal component, and in an amount usually in excess of 50% of the liquid composition, is the chemical 2-furaldehyde. This is an aldehyde having the formula as follows:

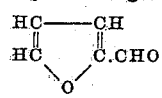

The second component is an organic solid illustrated by a content of either powdered or flaked cellulose ester. Usually from about ½% to 5% of such solid is ample.

The third component is coloring material for the chemical ink. I usually prefer to use two or more organic dyes as will be apparent from the description which follows. The percentages referred to above are by weight.

The several ingredients referred to above, that is the aldehyde, solid and the like, may be compounded together in any suitable manner. The following description concerning the process of preparing the ink composition is illustrative of one suitable method.

After the cellulose ester has dissolved in the aldehyde, by stirring, the dyes are added to the mixture and the mixture is given additional stirring sufficient to dissolve them.

A more detailed understanding of my invention will be had from a consideration of the following specific examples. In accordance with my preferred embodiment I employ a composition as follows: about 80–82% furfuraldehyde, between 1–2% of cellulose acetate butyrate, about 10% of yellow azo dye soluble in said furfuraldehyde, and between 2–6% each of a blue azo dye and an orange azo dye.

However, considering my invention on a broader basis the proportions may be varied over a somewhat greater range as illustrated by the next example. In accordance with this example the 2-furaldehyde was employed to the extent of 60–97%. The particular cellulose ester used as a solid was cellulose acetate butyrate in powder form, in the amount of about 1.2 to 3%. The coloring materials comprised three organic azo dyes, a yellow, a blue and an orange. The particular yellow is known as Oil Yellow. Its composition is described in "The Synthetic Dyestuffs and Intermediate Products," by Cain and Thorpe, 1934, page 105. The blue was a thiazole-azo-benzene composition of the following formula:

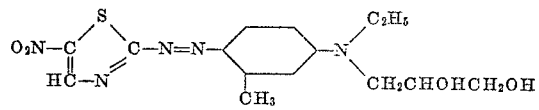

The orange was a benzene-azo-benzene composition of the following composition:

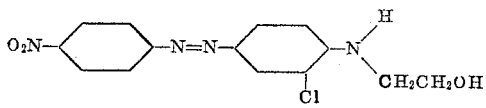

The above ingredients were compounded by a procedure as already described above. The composition was used in commercial operations for printing frame lines and footage marks on photographic film. The film was high acetyl cellulose acetate carrying an antistatic coating. However, the ink of this invention was quickly absorbed thereby preventing any offset printing on the next convolution of film. The ink was sufficiently absorbed into the film base as to make the markings an integral part thereof.

The above photographic film of this example, after exposure, was processed in conventional film processing solutions. The ink was sufficiently absorbed into the film so that the markings were unaffected, there being sufficient contrast so that the markings and other identification on the film were readily observable. Also the film was treated with conventional film cleaning liquids. The marking appeared to be substantially unaffected by such liquids.

Other examples comparable to the above example set forth in detail, were carried out with the above-described ink but wherein various other types of films were marked and tested. That is, polyester base film, as well as low acetyl cellulose ester film, was marked by the ink of the present invention. In all instances the ink was very quickly absorbed by the product being marked. The resultant marking was satisfactorily legible in all instances. Also, the marked product withstood treatment with the usual solutions employed for processing such type of film products.

It is apparent, therefore, from the foregoing description that I have provided a new chemical ink which is particularly useful in its versatility in marking various types of plastic films to give legible and reasonably permanent markings thereon.

While in the above description I have described a liquid in which three dyes are used and which gives a chemical ink marking the film product with a black color, my invention is not restricted to the use of exactly the dyes set forth. For example, if one wished to obtain a red color, dyes of the following type might be employed.

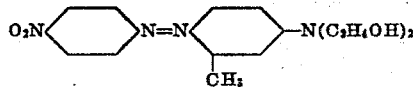

In general it has been observed that any dye which will reasonably disperse to the desired extent in 2-furaldehyde may be satisfactorily used.

It is, therefore, apparent from the foregoing that I have provided a new and improved chemical ink.

While in my specific embodiment set forth above I use 1–2% of cellulose acetate butyrate and amounts of dyes between 12 and 16%, and prefer this particular composition, in the broader aspects of my invention, the materials and proportions may be varied somewhat. For example, as already indicated above, powdered or flaked cellulose ester in the amount of .5–5% may be used. The amount of the yellow coloring material may be present from an amount sufficient to impart color up to 20%. The two other coloring agents may be used up to 12% each.

I claim:

1. A composition adapted for marking on film products, said composition being comprised of 80–82% 2-furaldehyde, 1–2% of cellulose acetate butyrate, about 10% of yellow azo dye soluble in said furaldehyde and 2–6% of a blue azo dye and an orange azo dye.

2. A composition adapted for marking on photographic film products, which composition consists essentially of more than 50% of 2-furaldehyde, from ½–5% of cellulose ester and an amount sufficient to impart color but not more than 20% of at least two dyes from the group consisting of oil yellow, a thiazole azo-benzene and a benzene-azo-benzene dye.

3. A composition adapted for marking on film products, which composition consists essentially of more than 60% of 2-furaldehyde, ½–5% of cellulose ester and 2–6% each of dyes having the following formulas:

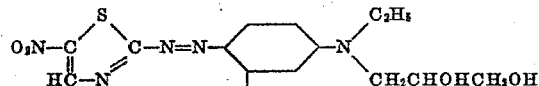

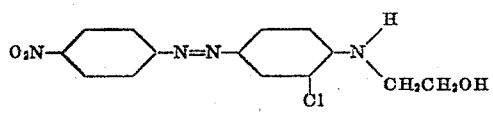

4. A liquid marking composition consisting essentially of more than 60% 2-furaldehyde, ½–5% of cellulose ester and sufficient quantity of a dye of the following formula to impart a red color to said liquid:

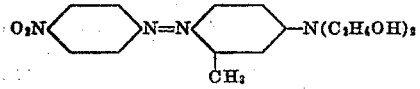

5. A composition adapted for marking on film products, which composition consists essentially of more than 50% of 2-furaldehyde, from .5 to 5% of powdered cellulose ester, and an amount sufficient to impart color of at least two coloring components from the group consisting of oil yellow up to 20%, thiazole azo-benzene up to 12% and benzene-azo-benzene up to 12%.

References Cited in the file of this patent

UNITED STATES PATENTS

| | | |
|---|---|---|
| 1,833,086 | Middleton | Nov. 24, 1931 |
| 1,914,522 | Miner | June 20, 1933 |
| 1,983,910 | Lummerzheim et al. | Dec. 11, 1934 |
| 2,091,966 | Davidson | Sept. 7, 1937 |

OTHER REFERENCES

Ellis: "Printing Inks," Reinhold (1940) (pp. 373–378 relied upon).